United States Patent [19]
Takeuchi et al.

[11] Patent Number: 6,063,311
[45] Date of Patent: May 16, 2000

[54] COMPOSITION FOR THERMISTER

[75] Inventors: Goro Takeuchi; Hirokazu Kobayashi, both of Tokyo, Japan

[73] Assignee: TDK Corporation, Tokyo, Japan

[21] Appl. No.: 09/369,894

[22] Filed: Aug. 9, 1999

[30] Foreign Application Priority Data

Aug. 19, 1998 [JP] Japan .................................. 10-232630

[51] Int. Cl.$^7$ ...................................................... H01B 1/08
[52] U.S. Cl. .................................. 252/521.2; 252/520.21
[58] Field of Search ............................. 252/521.1, 520.2, 252/520.21

[56] References Cited

FOREIGN PATENT DOCUMENTS 5-82313  4/1993  Japan .
6-231905  8/1994  Japan .

*Primary Examiner*—Mark Kopec
*Attorney, Agent, or Firm*—Oblon, Spivak, McClelland, Maier & Neustadt, P.C.

[57] ABSTRACT

Adding cobalt oxide 0.01 to 20 wt %, copper oxide 5 to 20 wt %, iron oxide 0.01 to 20 wt % and zirconium oxide 0.01 to 5.0 wt % to metallic oxides composed of in total 100 mol % in the percent of metals only where manganese is 50 to 90 mol % and nickel is 10 to 50 mol %.

1 Claim, No Drawings

COMPOSITION FOR THERMISTER

BACKGROUND OF THE INVENTION

1. Field of the Invention

The present invention relates to Composition for thermister, in particular such composition for NTC (Negative Temperature Coefficient) thermister for temperature detection, and to composition for realizing a highly reliable thermister where B constant thereof is 2000 to 3000K and resistance values changing with time passing are small.

2. Description of the Related Art

As a conventional NTC thermister for temperature detection, there are known compositions containing manganese, cobalt and nickel for the thermister comprising oxide semiconductor of main manganese oxide.

For making small changing ratio with time passing of resistance values of the thermister composition consisting of manganese, cobalt and nickel as main components used at high temperature and high moisture, it has been proposed to add one kind or more of $ZrO_2$ or CuO at determined contents (for example, Unexamined Japanese Patent Publication (kokai) No. 6-231905).

However, in the thermister composition comprising oxides of two kinds of metallic elements of manganese and nickel, or in the thermister composition where $ZrO_2$ or CuO were added to these oxides, the B constant was large as 3000K or more, and it was difficult to apply for compensating temperature of TCXO (quartz oscillator of temperature compensation type).

Incidentally, for the quartz oscillator of temperature compensation type, two thermisters are ordinarily used for low temperature side (−30 to 25° C.) and for high temperature side (25 to +85° C.).

However, in view of using environment of recent machinery, for minimizing changes in the oscillator due to temperature even in the low temperature side, there is a problem that unless the B constant of the thermister falls within a specific range, the temperature compensation of the quartz oscillator is not sufficient.

It is said that the B constant of the thermister is very preferable in "2000 to 3000K".

There is still a further problem that the resistance changing ratio at the high temperature and high moisture is large.

SUMMARY OF THE INVENTION

It is an object of the invention to provide a composition for realizing such a thermister of the B constant being 2000 to 3000K, less changing with time passing of the resistance value in an atmosphere of high temperature and high moisture, high thermal strength, and high reliability.

According to the present invention, the composition for thermister by adding cobalt oxide 0.01 to 20 wt %,
copper oxide 5 to 20 wt %,
iron oxide 0.01 to 20 wt % and
zirconium oxide 0.01 to 5.0 wt % to metallic oxides comprising in total 100 mol % in the percent of metals only where manganese is 50 to 90 mol % and nickel is 10 to 50 mol %.

By using this composition for thermister, it is possible to range the B constant to be 2000 to 300K, considerably reduce the resistance changing ratio under the using condition at high temperature and high moisture in comparison with conventional ones.

DETAILED DESCRIPTION OF THE INVENTION

The present invention will be described in detail referring to the following examples.

Each of samples as shown in Tables 1 to 3 were produced in the following manner.

Trimanganese tetroxide, nickel oxide, cobalt oxide, copper oxide, iron oxide and zirconium oxide, which were commercially available, were weighed and mixed such that the composition after sintering was the ratio of composition as shown in Tables 1 to 3, and wet-blended for 16 hours in a ball mill. These sold materials contain metallic compounds of small amounts such as Fe, Si, Na, K, Ca and others.

Subsequently, the mixture was dehydrated and dried, and pulverized with a mortar and a pestle. Next, the pulverized material was charged in an alumina pot and subjected to a temporary calcination at temperature of 800 to 1200° C. for 2 hours. The temporarily calcined material was finely ground, dehydrated, dried, added with polyvinyl alcohol (PVA) as a binder, granulated into pellets with the mortar and the pestle, and then formed under pressure into discs of 16 mm diameter and 2.5 mm thickness.

Next, the formed material was heated at temperature of 600° C. for 2 hours in an atmospheric air, and after removing the binder, calcined at temperature of 1000 to 1400° C. for 2 hours so as to turn out a sample. Thus produced sample was applied on both sides with screen process printings of silver paste, and baked at temperature of 850° C. so as to form electrodes. Each of the completed samples was measured with a DC four terminals method with respect to the resistance value of 25° C. (R25) and the resistance value of −30° C. (R-30), and specific resistance (ρ25) was calculated at 25° C. to with a later mentioned formula 1, and a later mentioned formula 2 was used to calculate the B constant (B25/−30) so as to provide results as shown in Tables 1 to 3.

Further, a sample was put in a boiling pure water at temperature of 100° C., and after boiling for 50 hours, measured in the resistance value (R25'), calculated in relation with an initial resistance value (R25) at temperature of 25° C. in regard to a resistance changing ratio (ΔR25) with a later mentioned formula 3, and immersed in a molten solder at high temperature of 350° C. for 3 seconds for carrying out a thermal strength test so as to provide results as shown in Tables 1 to 3.

$$p25(\Omega \cdot cm) = \frac{S}{t} \times R25 \quad \text{(Formula 1)}$$

ρ25: specific resistance at 25° C. (Ω·cm)
S: electrode area (cm$^2$)
t: sample thickness (cm)

R25: resistance value (Ω)

$$B25/-30(K) = \frac{2.3026 \times \log(R25/R-30)}{\left(\frac{1}{273.15+25} - \frac{1}{273.15-30}\right)} \quad \text{(Formula 2)}$$

B25/−30: B constant (K)
R25: resistance value (Ω) at 25° C.

R-30: resistance value (Ω) at −30° C.

$$\Delta R25 = \frac{R25' - R25}{R25} \times 100 \quad \text{(Formula 3)}$$

R25': resistance value (Ω) after a boiling test
R25: resistance value (Ω) before a boiling test
ΔR25: resistance changing ratio(Ω) after a boiling test

TABLE 1

| | Items | | | | | | | | | |
|---|---|---|---|---|---|---|---|---|---|---|
| | Ratio of composition | | | | | | | | | |
| | Main elements (mol %) | | Additives (wt %) | | | | Electrical properties | | | Thermal strength |
| Samples No. | Mn | Ni | CO | Fe | Cu | Zr | ρ25 (Ω·cm) | B(25/−30)K | ΔR25 (%) | Thermal cracks |
| ×1 | *95 | *5 | 10 | 10 | 10 | 5 | 1301 | *3323 | *6.9 | ○ |
| ○2 | 90 | 10 | 10 | 10 | 10 | 5 | 186 | 2819 | 4.2 | ○ |
| ○3 | 85 | 15 | 10 | 10 | 10 | 5 | 43 | 2484 | 1.4 | ○ |
| ○4 | 50 | 50 | 10 | 10 | 10 | 5 | 154 | 2879 | 3.3 | ○ |
| ×5 | *45 | *55 | 10 | 10 | 10 | 5 | 218 | *3608 | *5.4 | ○ |
| ×6 | *30 | *70 | 10 | 10 | 10 | 5 | 1100 | *3794 | *7.6 | ○ |
| ×7 | 90 | 10 | 10 | 10 | 10 | *0 | 131 | 2999 | *6.1 | ○ |
| ○8 | 90 | 10 | 10 | 10 | 10 | 0.01 | 138 | 2629 | 4.9 | ○ |
| ×9 | 90 | 50 | 10 | 10 | 10 | *10 | 236 | *3313 | 4.3 | ○ |
| ×10 | 50 | 50 | 10 | 10 | 10 | *0 | 127 | 2632 | *5.8 | ○ |
| ○11 | 50 | 50 | 10 | 10 | 10 | 0.01 | 131 | 2659 | 4.7 | ○ |
| ×12 | 50 | 50 | 10 | 10 | 10 | *10 | 196 | *3314 | 2.1 | ○ |
| ×13 | 50 | 50 | *0 | 10 | 10 | 5 | 230 | *3026 | 3.3 | ○ |
| ○14 | 50 | 50 | 0.01 | 10 | 10 | 5 | 218 | 2971 | 3.1 | ○ |
| ○15 | 50 | 50 | 20 | 10 | 10 | 5 | 121 | 2845 | 3.9 | ○ |

TABLE 2

| | Items | | | | | | | | | |
|---|---|---|---|---|---|---|---|---|---|---|
| | Ratio of composition | | | | | | | | | |
| | Main elements (mol %) | | Additives (wt %) | | | | Electrical properties | | | Thermal strength |
| Samples No. | Mn | Ni | CO | Fe | Cu | Zr | ρ25 (Ω·cm) | B(25/−30)K | ΔR25 (%) | Thermal cracks |
| ×16 | 50 | 50 | *25 | 10 | 10 | 5 | 97 | 2686 | *5.3 | ○ |
| ×17 | 50 | 50 | 10 | *0 | 10 | 5 | 114 | 2977 | *5.5 | × |
| ○18 | 50 | 50 | 10 | 0.01 | 10 | 5 | 122 | 2935 | 4.6 | ○ |
| ○19 | 50 | 50 | 10 | 20 | 10 | 5 | 234 | 2948 | 4.8 | ○ |
| ×20 | 50 | 50 | 10 | *25 | 10 | 5 | 289 | *3012 | *5.6 | ○ |
| ×21 | 50 | 50 | 10 | 10 | *0 | 5 | 2463 | *3622 | 1.1 | ○ |
| ○22 | 50 | 50 | 10 | 10 | 5 | 5 | 637 | 2982 | 2.1 | ○ |
| ○23 | 50 | 50 | 10 | 10 | 20 | 5 | 12 | 2002 | 4.5 | ○ |
| ×24 | 50 | 50 | 10 | 10 | *25 | 5 | 4 | 1858 | *9.6 | ○ |
| ×25 | 90 | 10 | *0 | 10 | 10 | 5 | 368 | *3037 | 2.3 | ○ |
| ○26 | 90 | 10 | 0.01 | 10 | 10 | 5 | 325 | 2942 | 2.2 | ○ |
| ○27 | 90 | 10 | 20 | 10 | 10 | 5 | 256 | 2955 | 1.4 | ○ |
| ×28 | 90 | 10 | *25 | 10 | 10 | 5 | 299 | #3163 | 1.2 | ○ |
| ×29 | 90 | 10 | 10 | *0 | 10 | 5 | 87 | 2973 | *6.3 | × |
| ○30 | 90 | 10 | 10 | 0.01 | 10 | 5 | 90 | 2948 | 4.8 | ○ |
| ○31 | 90 | 10 | 10 | 20 | 10 | 5 | 116 | 2743 | 3.5 | ○ |
| ×32 | 90 | 10 | 10 | *25 | 10 | 5 | 141 | 2762 | *6.8 | ○ |

TABLE 3

| | | | | | | | | | | |
|---|---|---|---|---|---|---|---|---|---|---|
| | Ratio of composition | | | | | | | | | |
| | Main elements (mol %) | | Additives (wt %) | | | | Electrical properties | | | Thermal strength |
| Samples No. | Mn | Ni | CO | Fe | Cu | Zr | $\rho 25$ ($\Omega \cdot cm$) | B(25/−30)K | $\Delta R25$ (%) | Thermal cracks |
| x33 | 90 | 10 | 10 | 10 | *0 | 5 | 2132 | *3542 | 3.1 | ○ |
| ○34 | 90 | 10 | 10 | 10 | 5 | 5 | 211 | 2855 | 3.8 | ○ |
| ○35 | 90 | 10 | 10 | 10 | 20 | 5 | 1.5 | 1989 | 4.9 | ○ |
| x36 | 90 | 10 | 10 | 10 | *25 | 5 | 1.2 | 1896 | *8.9 | ○ |

In Tables 1 to 3, the ○ marked Sample Nos.2, 3, 4, 8, 11, 14, 15, 18, 19, 22, 23, 26, 27, 30, 31, 34 and 35 are those of ratio of composition within the range of the invention, and the x marked Samples Nos.1, 5, 6, 7, 9, 10, 12, 13, 16, 17, 20, 21, 24, 25, 28, 29, 32, 33 and 36 are those out of the range of the invention, shown for comparative examples.

As is seen from Tables 1 to 3, the composition according to the present invention is practical as that $\rho 25$ is 1.5 to 637$\Omega \cdot$cm and B25−30 is 2000 to 3000K, and the thermal strength is high without causing thermal cracks. In the x marked composition, the B constant exceeds 3000K, or $\Delta R25$ is exceeds 5.0%. In the composition according to the present invention, $\Delta R25$ is very small and stable as 1.4 to 4.9%.

Further reference will be made to reasons for limiting numerical values.

If the ratio of manganese is less than 50 mol %, the B constant exceeds 3000K and $\Delta R25$ exceeds 5%, the use of the composition is not suitable at high temperature and high moisture (for example, see Sample No.5). If it is more than 90 mol %, not only the B constant exceeds 3000K, but also $\Delta R25$ exceeds 5% (for example, see Sample No.1). Preferably, the ratio of manganese is in the range of 60 to 88 mol %, and more preferably, in the range of 60 to 88 mol %.

If the ratio of nickel is less than 10 mol %, the B constant exceeds 3000K and $\Delta R25$ exceeds 5% (for example, see Sample No.1). If it is more than 50 mol %, $\Delta R25$ also exceeds 5% (for example, see Sample No.7). Preferably, the ratio of nickel is in the range of 12 to 40 mol %, and more preferably, in the range of 14 to 34 mol %.

If the addition amount of cobalt oxide as an additive is less than 0.01 wt %, the B constant is larger than 3000K (for example, see Sample No.13). If it exceeds 20 wt %, $\Delta R25$ also exceeds 5% (for example, see Sample No.16), or the B constant is larger than 3000K (for example, see Sample No.28). Preferably, the ratio of cobalt oxide is in the range of 0.01 to 15 mol %, and more preferably, in the range of 0.01 to 10 mol %.

If the amount of copper oxide as an additive is less than 5 wt %, the B constant is larger than 3000K (for example, see Sample No.21). If it exceeds 20 wt %, $\Delta R25$ is larger than 5% (for example, see Sample No.24). The amount of copper oxide is in the range of 5 to 20 mol %.

If the amount of iron oxide as an additive is less than 0.01 wt %, $\Delta R25$ exceeds 5% and the thermal cracks are generated in the thermal strength test (for example, see Sample Nos.17 and 29). If it exceeds 20 wt %, also $\Delta R25$ is larger than 5% (for example, see Sample Nos.20 and 32). The amount of iron oxide is in the range of 0.01 to 20 mol %.

If the amount of zirconium oxide as an additive is less than 0.01 wt %, $\Delta R25$ exceeds 5% (for example, see Sample Nos.7 and 10). If it exceeds 5.0 wt %, the B constant is larger than 3000K (for example, see Sample Nos.9 and 12). Preferably, the amount of zirconium oxide is in the range of 0.01 to 5 mol %, and more preferably, in the range of 0.01 to 3 mol %.

$\Delta R25$ is a substitution property for valuing the reliability of the thermister composition, and conventionally it is said that the resistance changing ratio of the quartz oscillator of temperature compensation type is preferably 5% or less.

As having stated, according to the invention, by adding cobalt oxide, copper oxide, iron oxide and zirconium oxide of the proper amount to the composition of main Mn—Ni based oxides, it is possible to obtain the composition for thermister having properties in the practical range where the resistance changing ratio is very small under using at high temperature and high moisture, the reliability is high, the thermal strength is high, and the use at low temperature side which was impossible conventionally is available by setting the B constant at 2000 to 3000K so that the change by the temperature of the oscillator is made minimum also at the low temperature side.

What is claimed is:

1. Composition for thermister, comprising a metallic oxide comprising in total 100 mol % in the percent of metals where manganese is 50 to 90 mol % and nickel is 10 to 50 mol %; wherein said metallic oxides contains:

cobalt oxide in the range of 0.01 to 20 wt %;

copper oxide in the range of 5 to 20 wt %;

iron oxide in the range of 0.01 to 20 wt % and zirconium oxide 0.01 to 5.0 wt %.

* * * * *